United States Patent [19]

Domeniconi

[11] 4,411,825

[45] Oct. 25, 1983

[54] CURRENT COLLECTOR MANUFACTURING PROCESS FOR AN ELECTROCHEMICAL CELL

[75] Inventor: Michael Domeniconi, Santa Clara, Calif.

[73] Assignee: Altus Corporation, San Jose, Calif.

[21] Appl. No.: 308,258

[22] Filed: Oct. 5, 1981

[51] Int. Cl.³ .............................................. H01B 1/04
[52] U.S. Cl. .................................. 252/503; 252/506; 252/182.1
[58] Field of Search ..................... 252/503, 182.1, 506, 252/510; 29/25.17

[56] References Cited

U.S. PATENT DOCUMENTS 4,225,216  9/1980  Boyd et al. ...................... 252/518

Primary Examiner—Josephine Barr
Attorney, Agent, or Firm—Flehr, Hohbach, Test, Albritton & Herbert

[57] ABSTRACT

A method of preparing a solid current collector containing carbon and metal for use in an electrochemical cell comprising a consummable metal anode, a liquid cathode and said current collector, said method comprising providing a solution of a salt of said metal, wetting carbon with said solution, removing the solvent and exposing the solid composition of carbon and metal salt to a reducing atmosphere to reduce the metal ions to elemental metal.

16 Claims, No Drawings

CURRENT COLLECTOR MANUFACTURING PROCESS FOR AN ELECTROCHEMICAL CELL

This invention relates to electrochemical cells of a liquid cathode type having a lithium anode and thionyl chloride as the active cathode depolarizaer. More particularly, it relates to a method of manufacture of the solid current collector that is amenable to automated procedures.

In recent years, the quest for a substantially improved general purpose primary electrochemical cell and battery has resulted in the development of cells in which the active cathode depolarizer is a liquid. Such cells are typically referred to as liquid cathode cells. Also included in this type of cell is a solid current collector whose function is to provide a catalytic surface upon which the active cathode depolarizer is reduced during normal cell operation and through which electrical charge may flow to an external circuit. Additionally, a mechanical separators may be required to isolate the current collector from the anode but at the same time allowing the free passage of electrolyte.

Although the fundamental performance characteristics of the cell are determined principally by the anode and active cathode depolarizer material, recent developments have shown that the current collector plays a significant role in determining the overall performance of the cell. For example, British Pat. No. 1,409,307 issued to Blomgren, et al. on Oct. 18, 1975, teaches the desirability of a high surface area material such as carbon be used as the current collector. More recently, U.S. Pat. No. 4,167,608 to Giattino demonstrates that the addition of elemental copper to the cell provides substantial improvements in both performance and safety.

U.S. Pat. No. 4,219,443 issued to Klinedinst and Murphy on Aug. 26, 1980 teaches one method of preparing cathode current collectors which incorporate finely divided gold and platinum (as well as nickel oxide and copper sulfide) in combination with carbon black.

In commonly assigned U.S. Ser. No. 290,658, filed Aug. 6, 1981, it is disclosed that the energy density as shown by improved cell life of cells having a lithium anode, thionyl chloride liquid cathode and a carbonaceous current collector is improved by adding to the current collector one or more of the following metals: platinum, titanium, niobium, tantalum, antimony, vanadium, tin, nickel, gold, silver, tungsten, molybdenum, palladium, manganese, cobalt, cadmium, zinc, indium and yttrium.

It is therefore now known that a current collector made from a mixture of an aforementioned elemental metal and carbon has significant advantages over a current collector of either a pure metal or pure carbon. However, while a current collector made from these two materials demonstrates substantial performance advantages, it is difficult to make in a high volume production environment. This is true because carbon and elemental metal mixed in a conventional manner do not adhere to each other, and any mixture of the two tends to separate with the metal settling to the bottom of the container. As a result, hoppers of current collector material cannot be made in advance and stored for use in a high volume production operation.

It is therefore an object of this invention to provide a manufacturing process for current collectors composed of carbon and a metal which is amenable to automation techniques.

It is another object of this invention to provide a manufacturing process for the current collector in a lithium anode, thionyl chloride active cathode depolarizer cell which provides a unifom distribution of a metal, preferably copper, in carbon.

These and other objects of the invention are achieved in a method of manufacturing the current collector of an electrochemical cell having an oxidizable anode, a liquid cathode and a solid nonconsumable current collector consisting of a combination of carbon and a metal and which includes the following steps: Forming a salt of the metal to be mixed with the carbon; dissolving the salt in a solvent to form a solution of the metal salt; wetting the carbon with the solution; removing the solvent from the wetted carbon; and exposing the carbon and metal salt to a reducing atmosphere so as to reduce the metal salt to an elemental metal.

Descriptions of liquid cathode cells are given in substantial detail in the Blomgren and Giattino patents cited previously as well as U.S. Pat. No. 3,926,669 issued to Auborn on Dec. 16, 1975. These patents discuss liquid cathode cells using oxyhalides such as thionyl chloride, sulfuryl chloride, and phosphorous oxychloride as the active cathode depolarizer. U.S. Pat. No. 3,567,515 issued to Maricle on Mar. 2, 1971, discusses in detail a liquid cathode cell using sulfur dioxide as the active cathode depolarizer.

In each of the foregoing reference patents, the necessity for a solid, nonconsummable current collector is recited along with typical materials that may be of some value.

A current collector made of a combination of carbon and a metal suitable for use in the cells referenced in the foregoing patents is described below in connection with the most advanced of those cells, namely the lithium anode, thionyl chloride active cathode depolarizer cell.

With the lithium anode thionyl chloride cell, a combination of copper and carbon mixed in a ratio of approximately 4:1 carbon to copper by weight has been found to be advantageous for use as a current collector.

Other useful metal-containing carbon current collectors consist of carbon into which is blended small particles of one or more of the following metals: platinum, titanium, niobium, tantalum, antimony, vanadium, indium, tin, nickel, gold, zinc, tungsten, molybdenum, silver, palladium, manganese, cobalt, cadmium, and yttrium. Percentages of from 1 to 25 by weight of metal to carbon are useful.

According to the present invention, the dispersion of the metal in the carbon is accomplished by first forming a metal salt, such as copper chloride ($CuCl_2$) or copper nitrate $Cu(NO_3)_2$ by procedures well known in the chemical art. The salt is then dissolved in a suitable solvent. In the case of copper chloride or copper nitrate, water may be used as a solvent. A solution in the range of 25 weight percent has been found to work satisfactorily.

For Group IIb metals such as zinc and cadmium, salts such as the halide salts, nitrates and sulfates are useful. For the Group IIIb metals, such as indium, the Group IVb metals, such as tin, and the Group Vb metals, such as antimony, the halide salts are useful. For the transition metals of the first series, such as titanium, vanadium, manganese, cobalt and nickel, the second series, such as niobium, molybdenum, palladium, silver and yttrium, and the third series, such as platinum, gold, tantalum and tungsten, water soluble salts such as the halide salts, sulfates, nitrates, etc. are useful.

Once the solution of the metal salt is manufactured, the carbon must be wetted by the solution. This may be accomplished in any convenient way. For example, a slurry of carbon in the copper salt solution may be formed by vigorously stirring the carbon into the solution. This solution can also include a binder for the cathode such as Teflon ® (polytetrafluoroethylene) and it may also include a wetting agent such as Trinton ®X-100 (polyethylene glycol p-isooctylphenyl ether), manufactured by Rohm and Haas Company. After the slurry is made, the solvent is removed typically by evaporation. This may be accomplished by subjecting the slurry to a vacuum and to elevated temperatures, or both.

Alternatively, a technique known as the incipient wetting may be used to wet the carbon. Incipient wetting is a qualitative term meaning the point at which a material begins to act as a liquid as opposed to a solid. For example, the incipient wetting point is reached when particles of the solid begin adhering. The volume of liquid required to incipiently wet a volume of dry material is determined empirically.

Thus, the incipient wetting technique involves determining the specific batch size of current collector to be made, determining the amount of liquid required to incipiently wet the batch size, making a solution of the metal salt, and blending the previously determined quantity of the solution with the carbon to form an incipiently wetted mix.

As in the case with the slurry method, an incipiently wetted mix is subjected to a vacuum to remove the solvent material.

The next step involves reducing the metal salt to form the elemental metal. This may be accomplished by exposing the dry metal salt carbon mixture to a reducing atmosphere. In the case of copper chloride and copper nitrate reduction may be accomplished by exposing the mixture of carbon and the copper salt to an atmosphere of approximately 5% hydrogen and 90% inert gas such as nitrogen or argon at a temperature of approximately 400° C. for eight hours. Alternatively, an atmosphere consisting of 5% hydrogen and 95% nitrogen may be used at 500° C. for 5 hours.

After reduction, the temperature of the metal salt carbon mixture is reduced to ambient while still in the presence of the reducing atmosphere or another inert atmosphere. Finally, although not necessary, it may be desirable to expose the mixture to an oxidizing atmosphere to form a controlled oxide surface on the metal. In the case of copper, the oxidizing atmosphere consists of 5% oxygen and 95% argon.

Table I compares the performance of lithium thionyl chloride cells made according to the invention described herein, with cells made by admixing finely divided metallic copper and carbon. It is seen that cell performance obtainable with the addition of metallic copper to the cathode are maintained when the cathode is prepared according to the present invention.

TABLE I

| Cathode Description | Cell Capacity | Discharge Current Density |
|---|---|---|
| 4:1 Carbon/Copper- prepared according to this invention | 152 mAH | 65 mA/cm$^2$ |
| 4:1 Carbon/Copper - Prior art | 160 mAH | 65 mA/cm$^2$ |
| Carbon only - Prior art | 100 mAH | 63 mA/cm$^2$ |

What is claimed is:

1. In a method of manufacturing a solid nonconsummable current collector consisting of carbon and a metal for use in an electrochemical cell comprising an oxidizable anode, a liquid cathode and a said current collector; the improvement comprising the steps of:
   providing a solution of a salt of said metal;
   wetting said carbon with said solution;
   removing the solvent from said wetted carbon to form a solid composition of carbon and metal salt; and
   exposing said composition of carbon and metal salt to a reducing atmosphere thereby reducing the metal ions of said metal salt to elemental metal.

2. The method of claim 1 wherein said wetting step is accomplished by incipient wetting.

3. The method of claim 1 wherein wetting is accomplished by forming a slurry of carbon in said metal salt solution.

4. The method of claim 3 wherein said anode is lithium and said liquid cathode material comprises an oxyhalide.

5. The method of claim 3 wherein said anode is lithium and said liquid cathode material comprises thionyl chloride.

6. The method of claim 3 wherein said anode is lithium and said liquid cathode material comprises sulfuryl chloride.

7. The method of claim 4 wherein a wetting agent is added to said slurry.

8. The method according to claim 7 wherein said wetting agent is polyethylene glycol p-isooctylphenyl ether.

9. The method of claim 4 wherein a binder material is added to said slurry.

10. The method according to claim 9 wherein said binder material is polytetrafluoroethylene.

11. The method of claim 4 wherein said salt is copper chloride.

12. The method of claim 4 wherein said salt is copper nitrate.

13. The method according to claim 11 wherein said reducing atmosphere comprises hydrogen gas.

14. The method according to claim 13 wherein subsequent to said exposure to a reducing atmosphere, said composition is exposed to an oxidizing atmosphere to form a copper oxide surface thereon.

15. The method according to claim 13 wherein said reducing atmosphere comprises hydrogen and inert gas.

16. The method according to claim 15 wherein subsequent to said exposure to a reducing atmosphere said composition is exposed to an oxidizing atmosphere to form a copper oxide surface thereon.

* * * * *